US006941277B2

(12) United States Patent
Imago

(10) Patent No.: US 6,941,277 B2
(45) Date of Patent: Sep. 6, 2005

(54) METHODS AND SYSTEMS FOR PROVIDING ONLINE INFORMATION FOR NETWORKED DEVICES

(75) Inventor: Satosi Imago, Kanagawa (JP)

(73) Assignee: Ricoh Co., Ltd., Tokyo (JP)

( * ) Notice: Subject to any disclaimer, the term of this patent is extended or adjusted under 35 U.S.C. 154(b) by 351 days.

(21) Appl. No.: 10/184,449

(22) Filed: Jun. 28, 2002

(65) Prior Publication Data

US 2003/0018742 A1 Jan. 23, 2003

(30) Foreign Application Priority Data

Jul. 6, 2001 (JP) ....................................... 2001-205520

(51) Int. Cl.[7] ................................................ G06F 15/16

(52) U.S. Cl. .............................. 705/27; 705/26; 707/3; 707/100; 709/218; 709/219; 709/203

(58) Field of Search .............................. 705/26, 27, 29, 705/1; 707/1, 3, 4, 100, 103 Y, 103; 709/200, 203, 217, 218, 219

(56) References Cited

U.S. PATENT DOCUMENTS 5,950,173 A * 9/1999 Perkowski .................. 705/26

FOREIGN PATENT DOCUMENTS

| | | |
|---|---|---|
| JP | 5-324507 | 12/1993 |
| JP | 411316636 A | * 11/1999 |
| JP | 2001344366 A | * 12/2001 |
| JP | 2002108816 A | * 4/2002 |

* cited by examiner

*Primary Examiner*—B. James Peikari
(74) *Attorney, Agent, or Firm*—Knoble Yoshida & Dunleavy LLC

(57) ABSTRACT

Online information is centrally stored for various devices, and the online information includes reference manual and related information such as related products, new products and maintenance information. The online information is retrieved from a user display unit that is either independent or is incorporated in the device. The online information is selected from a list of devices that is connected to the network. The online information is also further searched based upon a key that a user specifies.

32 Claims, 8 Drawing Sheets

DEVICE SELECTION INFORMATION GROUP (23, 21, 22) — SEARCH KEY INFORMATION GROUP (24, 25)

| PRODUCT TYPE (23) | PRODUCT NAME (21) | MANUFACTURER NAME (22) | DEVICE CODE (24) | MANUFACTURER CODE (25) |
| --- | --- | --- | --- | --- |
| WASHING MACHINE | PRODUCT NAME1 | COMPANY A | 123456 | MakerA.com |
| MICROWAVE OVEN | PRODUCT NAME2 | COMPANY B | abcdefg | MakerB.com |
| ... | ... | ... | ... | ... |

FIG. 2

| MANUFACTURER CODE | DEVICE CODE | WHOLE MANUAL | 1ST PARTIAL MANUAL | 2ND PARTIAL MANUAL | NTH PARTIAL MANUAL ... |
|---|---|---|---|---|---|
| Maker A.com | 1234546 | | | | ..... |
| Maker B.com | abcdefg | | | | ..... |
| ..... | ..... | ..... | ..... | ..... | ..... |

FIG. 5

METHODS AND SYSTEMS FOR PROVIDING ONLINE INFORMATION FOR NETWORKED DEVICES

FIELD OF THE INVENTION

The current invention is generally related to a method of and a system for searching information in reference manuals, and more particularly related to the method and the system for searching via the Internet information in the manuals and for displaying the searched information. For example, when malfunctions occur in the office environment, the manuals contain information on the devices such as copiers and printers that are connected to a local area network. Similarly, when it is not clear how to operate a particular appliance at home, the manual contains information on appliances.

BACKGROUND OF THE INVENTION

Japanese Patent Publication Hei 5-324507 discloses "an online manual reference system" that stores online manual for devices. The same prior art reference also discloses a method of accessing the online manual reference system via network and referring to a corresponding online manual. That is, a unit for displaying a user an online manual stores network addresses of the devices that are connected to the network. Using a corresponding network address, the unit transmits a specified device a request for transmitting an online manual based upon user instructions. Upon receiving the above transmission request, the device responds to the requesting unit by retrieving the requested online manual from its memory storage unit.

In summary, the above online manual display technologies in Japanese Patent Publication Hei 5-324507 indicate the integrated displaying operation of online manuals for a plurality of devices that is connected to the network. In displaying the manuals, the above technologies place the online manuals in a plurality of separate multiple windows. The above prior art online manual displaying method and system require that the manuals are locally stored in the devices. To locally store the manuals, each device must own an additional storage unit such as read-only memory (ROM) or a hard disk. The additional storage unit undesirably increases the manufacturing cost of the devices or appliance.

Furthermore, the manufacturing plan may be delayed by the completion of the manuals since the manuals have to be stored in each device. In other words, although the device manufacturing process and the manual generation process take place in parallel, if the manual is not completed, the device manufacturing process is also not completed. As a result of the above dependency, the manufacturing process may be undesirably extended.

In addition, it is hard to revise the internally stored manuals. In some instances, the revisions are necessary for errors or additional information. In other instances, the revisions are necessary to update the information over time. For example, when a customer service telephone number is changed after the first shipment of the devices, it is difficult to change the telephone number that is internally stored in the device.

Lastly, it is also hard in the prior art technology to display information form a plurality of sources. In displaying a device manual, it is desirable to display information that is related to the device. For example, the related information includes recall notices and safety information that had become available after the sales. The related information is displayed in the same screen where the manual is displayed for promoting the user safety. The additional information also includes related services and products that can be displayed.

The above described difficulties remain as issues and should be improved.

SUMMARY OF THE INVENTION

In order to solve the above and other problems according the first aspect of the current invention, a method of providing online information, including the steps of connecting devices to a network, storing predetermined sets of information on the devices in a single server that is connected to the network, requesting from a display unit the devices for which the information is available to compile a first list, displaying a first list of the devices at the display unit, selecting one device from the first list at the display unit, specifying one of the devices by transmitting device information on at least the selected specified one device from the display unit to the server, searching at the server for the information that corresponds to the device information to generate relevant information, and transmitting from the server to an ouput location the relevant information.

According to the second aspect of the current invention, a system for providing online information, including devices that are connected to a network, a manual server connected to the network having a memory storage unit for storing predetermined sets of information on the devices, and a manual display unit connected to the network further including a display panel as the output location for displaying relevant information, the manual display unit requesting the devices for which the information is available to compile a first list, the display panel displaying the first list of the devices, the display panel having an input capability for selecting one of the devices from the first list, the manual display unit transmitting device information on at least the selected one device to the manual server, wherein the manual server searches the memory storage for the information that corresponds to the selected device information to generate the relevant information, the manual server transmitting to an output location the relevant information.

According to the third aspect of the current invention, A device for interfacing online information from a manual server connected to a network having a memory storage unit for storing predetermined sets of information on devices, a manual display unit broadcasting an inquiry to the devices, the manual server searching the memory storage for the information based upon specified device information to generate relevant information, the manual server transmitting to an output location the relevant information, each of the devices connected to the network for performing a predetermined task, each of the devices including, a device information response unit for transmitting device information to the manual display unit in response to the inquiry, the manual display unit compiling a device list based upon the device information and transmitting the device list to the devices, an input unit for selecting one of devices from the device list by transmitting the specified device information on the selected one of the devices to the manual server via the network, and a display panel as the output location for displaying the relevant information.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 2 is a table illustrating one example of the device information that the information obtaining unit has collected from the devices and placed in a table format.

FIG. 5 shows an exemplary table content of a reference manual that is stored in the device manual storage unit according to the current invention.

Figure 6:
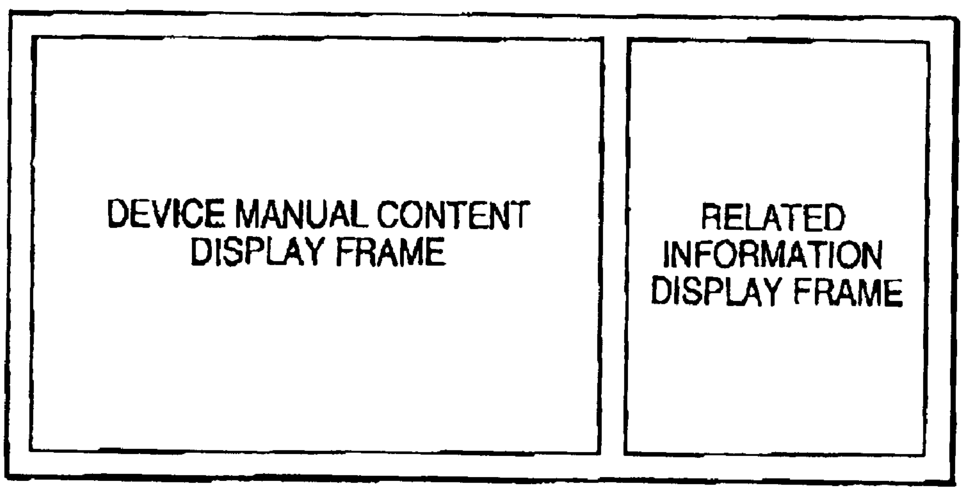

to FIG. 6 is an exemplary display in a preferred embodiment of the display unit according to the current invention.

Figure 7:
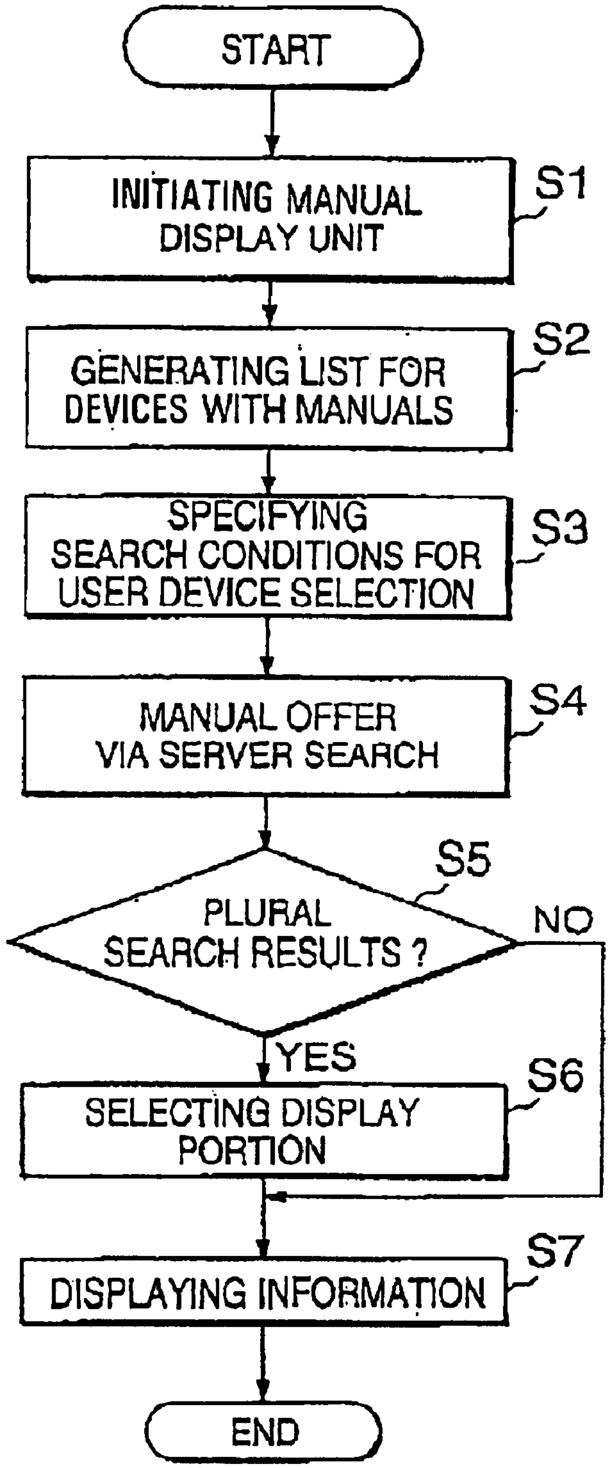

FIG. 7 is a flow chart illustrating steps involved in a preferred process of searching the manual according to the current invention.

Figure 8:
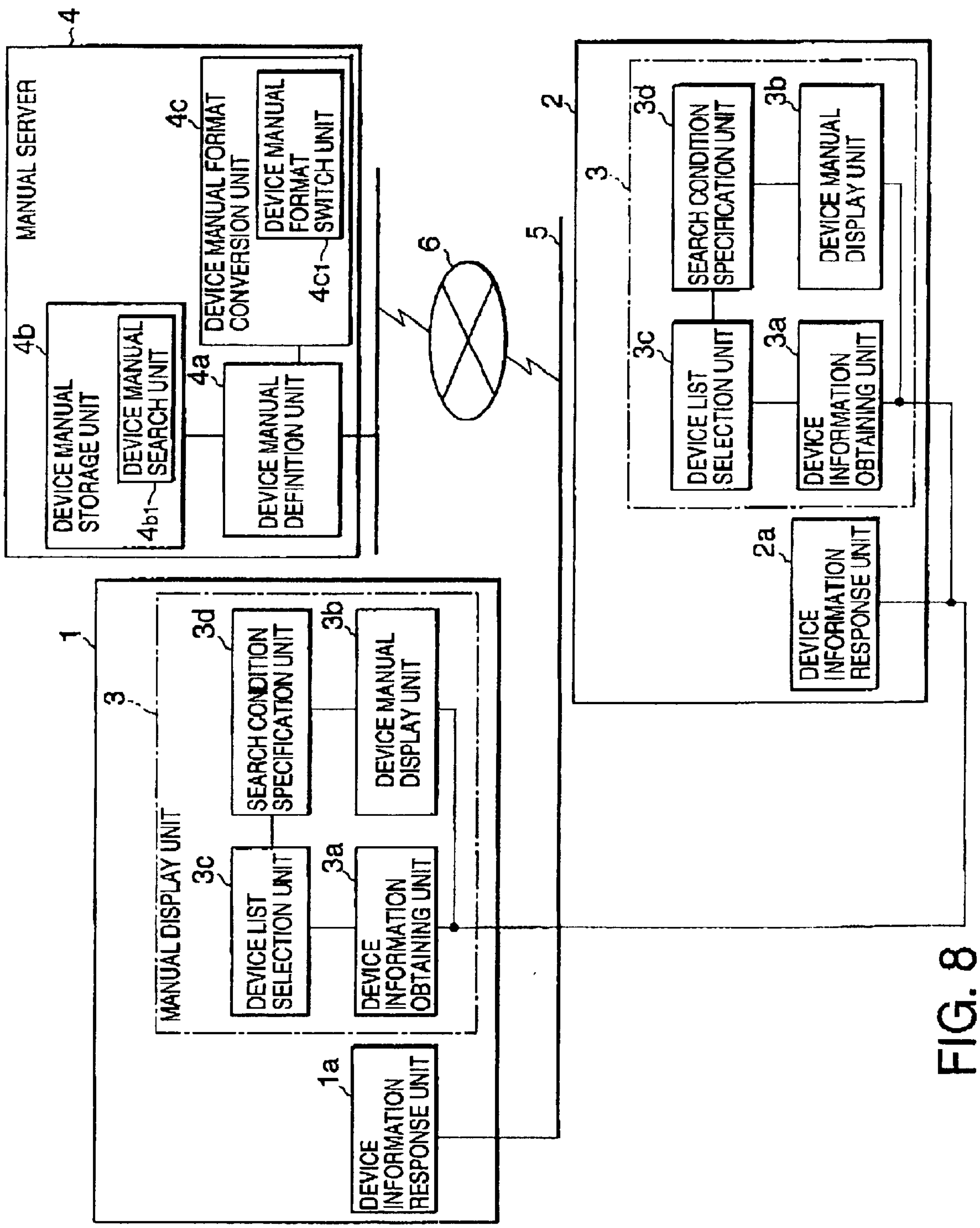

FIG. 8 is a block diagram illustrating an overall view of a second preferred embodiment of the reference manual search system according to the current invention.

DETAILED DESCRIPTION OF THE PREFERRED EMBODIMENT(S)

Based upon incorporation by external reference, the current application incorporates all disclosures in the corresponding foreign priority document (JP2001-205520) from which the current application claims priority.

Figure 1:
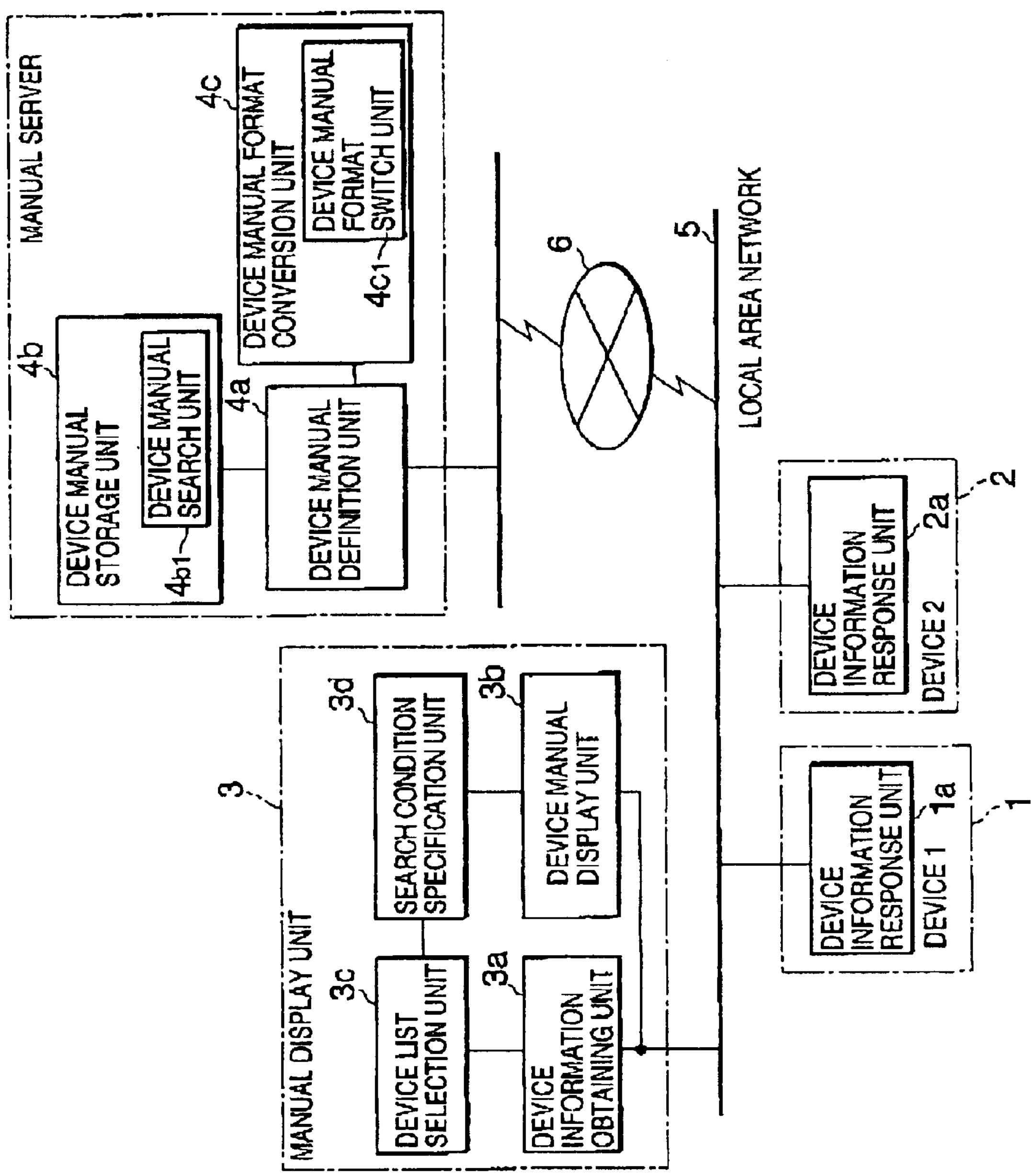
FIG. 1 is a block diagram illustrating an overall view of one preferred embodiment of the reference manual search system according to the current invention.

Referring now to the drawings, wherein like reference numerals designate corresponding structures throughout the views, and referring in particular to FIG. 1, a block diagram illustrates an overall view of one preferred embodiment of the reference manual search system according to the current invention. The first preferred embodiment includes a first device 1, a second device 2, a manual display unit 3 and a manual server 4. The first device 1 and the second device 2 are connected to a common local network 5 and perform a predetermined function. The first device 1 and the second device 2 include not only information processing devices such as personal computers, printers and scanners but also any office equipment such as copiers and fax machines. Furthermore, the first device 1 and the second device 2 also include home appliances such as audio visual equipment and washers. The first device 1 and the second device 2 are a target for the reference manual search according to the current invention. The manual display unit 3 displays a reference manual and is typically implemented by a personal computer. By directly operating the manual display unit 3, the user sees a desired reference manual for a specified device. The first device 1 and the second device 2 are connected to the manual display unit 3 via the common local network 5 in the bus format.

In the preferred embodiment of the reference manual search system according to the current invention, the manual server or reference manual storage server 4 centrally stores reference manuals for various devices and or appliances. The manual server 4 communicates with the manual display unit 3 through a wide area network 6 such as the Internet and the intranet, which is connected to the local area network 5. That is, when the manual display unit 3 transmits a manual transmission request to the manual server 4 via the networks 5 and 6, the manual server 4 responds by transmitting a corresponding reference manual to the manual display unit 3. The preferred embodiment does not necessarily include the opposite request from the manual server 4 to the manual display unit 3. The manual display unit 3 further includes a device information obtaining unit 3*a*, a device manual display unit 3*b*, a device list-selection unit 3*c* and a search condition specification unit 3*d*. The manual server 4 further includes a device manual definition unit 4*a*, a device manual storage unit 4*b* and a device manual format conversion unit 4*c*. The device manual storage unit 4*b* further includes a device manual search unit 4*b*1 whereas the device manual format conversion unit 4*c* includes a device manual format switch unit 4*c*1.

Still referring to FIG. 1, in the preferred embodiment, the first device 1 and the second device 2 respectively further include a device information response unit 1*a* and 2*a*. When the first device 1 or the second device 2 receives an inquiry request for the device information from the manual display unit 3, the device information response units 1*a* and 2*a* respond to the request. The device information inquiry request includes predetermined key information for a key search to obtain a corresponding manual from the manual server 4 and device selection information for a user selection list to be displayed on the device list selection unit 3*c*, which is equipped in the manual display unit 3. For example, the above search key information to be used as a key for the manual server 4 includes a device code that uniquely specifies a device product name or a device product type and a manufacturer code that uniquely specifies a device manufacturer. The search key information is not limited to the above example and includes any other information that is used to specify a desired reference manual for a specified device. Similarly, one example of the device selection information for a user selection list to be displayed on the device list selection unit 3*c* includes a product name that indicates an unique product name and corresponds to a predetermined one of the product code, a manufacturer name that specifies a manufacturer and corresponds to a predetermined one of the manufacturer code as well as a product type that classifies products into groups such as copiers and washers. The device selection information is not limited to the above example and includes any other information that is used by a user to select a desired device.

The device information obtaining unit 3*a* in the manual display unit 3 broadcasts or multicasts a device information inquiry request in the local area network 5. A device receives the broadcast and determines whether or not the device inquiry request is addressed to the received device itself. Upon acknowledging the device inquiry request, the device transmits its own device selection information to the device information obtaining unit 3*a* in the manual display unit 3 based upon a predetermined protocol. The information obtaining unit 3*a* is activated when the manual display unit 3 is initiated. To obtain the device information for a user-specified device for later displaying the corresponding device manual, the information obtaining unit 3*a* transmits the above described device information inquiry request onto the local area network 5. As described above, the information obtaining unit 3*a* broadcasts or multicasts the device information inquiry request. When a device identifies that the device information inquiry request is addressed to the device, the corresponding device information response unit such as 1*a* and 2*a* responds by transmitting its own device information to the information obtaining unit 3*a* of the manual display unit 3 in accordance with a predetermined protocol. Thus, the device list selection unit 3*c* collects the device information from the responding device. Alternatively, when the devices are connected to the network, the device information of each device is individually registered with the manual server 4 so that a device list is generated for the devices that are connected to the network.

Now referring to FIG. 2, a table illustrates one example of the device information that the information obtaining unit 3*a* has collected from the devices and placed in a table format. The collected device information includes a device selection information group and a search key information group. The device selection information group further included product names 21, manufacturer names 22 and product types 23. The search key information group further includes device or product codes 24 and manufacturer codes 25. For example, the product types 23 include predetermined types such as washing machines and microwave ovens. Similarly, the product names 21 include predetermined names such as product name 1 and product name 2. The manufacturer names 22 include predetermined names such as Company A and Company B. The device code 24 and the manufacturer code 25 both respectively correspond to a unique one of the product names 21 and a unique one of the manufacturer names 22. For example, a device code, 123456 in the device code 24 corresponds to a product name, Product Name 1 in the product names 21. Similarly, a manufacturer code, MakerB.com in the manufacturer code 25 corresponds to a manufacturer name, Company B in the manufacturer names 22.

Referring back to FIG. 1, the device list selection unit 3*c* and the search condition specification unit 3*d* are generally used to select a user-specified device. The device list selection unit 3*c* extracts only the device selection information from the device information and displays a list of the device selection information for a user to select a device. Thus, the device list selection unit 3*c* provides a selection means to select a device whose corresponding reference manual is displayed. On the other hand, the search condition specification unit 3*d* is used to search a particular portion in the device manual that has been specified based upon a selected product name from the device list selection unit 3*c*. The search conditions are inputted in natural language. Alternatively, the search conditions are specified in a predetermined search equation that includes certain key connective words such as AND and OR. Finally, the device manual display unit 3*b* transmits to the manual server 4 the search information that has been specified by the device list selection unit 3*c* and the search condition specification unit 3*d*. The search key information for the device that is specified by the device list selection unit 3*c* further includes the device codes 24 and the manufacturer codes 25. In addition, the search key information further includes the search condition that has been specified by the search condition specification unit 3*d* and the output location as shown in FIG. 3 such as a screen or a printer that has been specified via the device list selection unit 3*c*.

Figure 3:
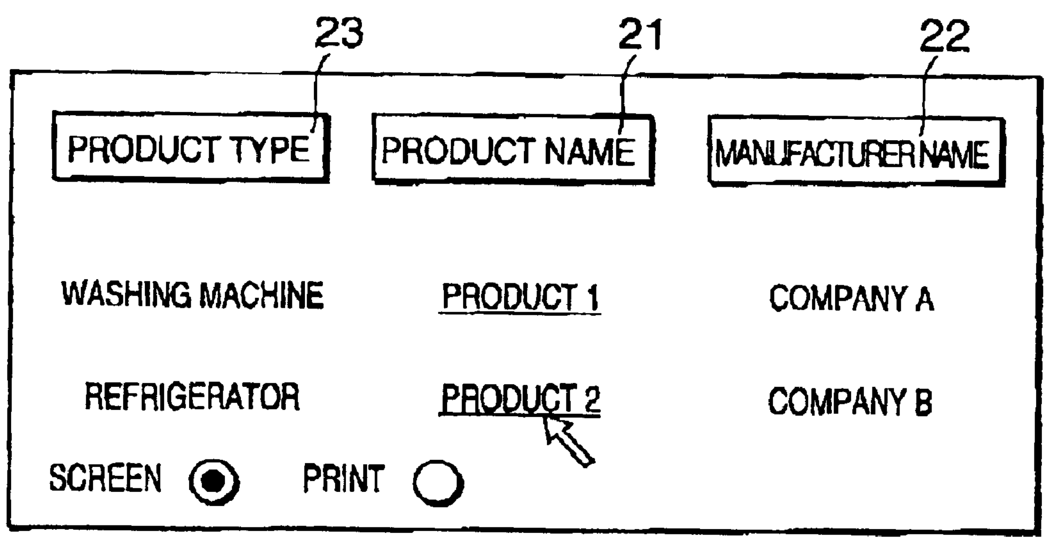
FIG. 3 is a diagram illustrating an exemplary display screen content of the device list selection unit according to the current invention.

Now referring to FIG. 3, a diagram illustrates an exemplary display screen content of the device list selection unit 3*c* according to the current invention. The display screen includes a first column of the product type 23, a second column of the product name 21 and the third column of the manufacturer name. The product type 23 includes a selection of washing machines and refrigerators. The product name 21 includes a selection of Product 1 and Product 2. The manufacturer name 22 includes a selection of Company A and Company B. Lastly, the display screen includes an output selection of a screen and a printer where the search result or the output is directed. For example, from the displayed list of the device selection information, the user selects a product name from the product name list 21 in order to display a corresponding reference manual via an input device such as a mouse. Similarly, the user clicks a screen button to display the selected reference manual on the screen while he or she clicks a print button to print out the selected reference manual. In the example in FIG. 3, the user has selected a reference manual for the Product 2 in the product name column 21 to be displayed on the screen as respectively indicated by the arrow and the highlighted button.

Figure 4:
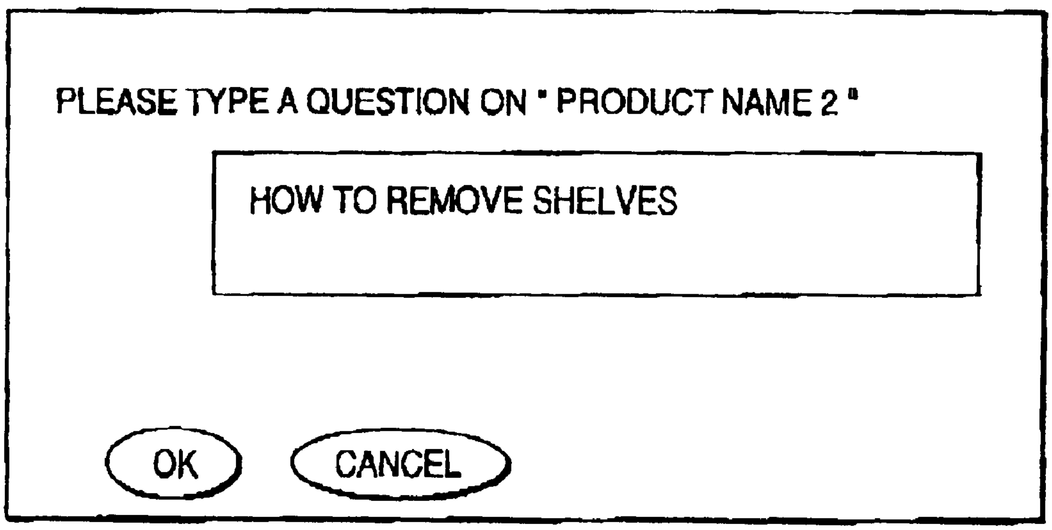
FIG. 4 is a diagram illustrating an exemplary user interface screen for the search condition specification unit according to the current invention.

FIG. 4 is a diagram illustrating an exemplary user interface screen for the search condition specification unit 3*d* according to the current invention. For example, after the user has selected a reference manual for the Product 2 such as a refrigerator in the product name column 21 as shown in FIG. 3, the user now further specifies a detailed condition that is related to "how to remove shelves" in natural language as shown in FIG. 4. As the user clicks the OK button on the same screen user-interface, the above specified "how to remove shelves" is inputted as a search condition. Based upon the search condition, a portion that contains the relevant information is searched in the reference manual for Product 2.

Once again, referring back to FIG. 1, the manual server 4 further includes a device manual definition unit 4*a*, a device manual storage unit 4*b* and a device manual format conversion unit 4*c*. The device manual storage unit 4*b* stores the reference manuals of predetermined devices as a whole as well as portions. Using the device manual storage unit 4*b*, a particular one of the reference manuals is initially identified as a whole manual to be searched based upon the search key information such as a combination of the product code 24 and a manufacturer code 25. The portions are stored in divided groups based upon a search unit such as a chapter and a paragraph. The device manual storage unit 4*b* further includes a device manual search unit $\mathbf{4}b_1$, which searches a particular unit among the divided groups based the search conditions. That is, the device manual search unit $\mathbf{4}b_1$ in the above device manual storage unit 4*b* has a search function to search only a relevant portion of the device manual in the above device manual storage unit 4*b* based upon the search conditions from the manual display unit 3. When a plurality of headings matches the above specified search condition, a list of the matching heading is returned to the manual display unit 3 for tentatively displaying the list. A user selects a desired heading from the displayed list, and the selected information is transmitted to the manual server 4. As a result, the corresponding portion of the manual for the selected heading is finally sent to the manual display unit 3. When the search condition specification unit 3*d* fails to specify any of the above described partial search conditions, the manual server 4 returns to the manual display unit 3 the whole manual based upon the manual search information. The manual server 4 returns to the manual display unit 3 the specified reference manual information in a predetermined format such as Hyper-Text Markup Language (HTML). When the manual server 4 returns more than a single portion of a reference manual as a search result in response to a search condition that has been specified by the search condition specification unit 3*d*, the device manual display unit 3*b* displays the above candidates by its chapter or paragraph headings. The user then further specifies one of the candidate headings, and the device manual display unit 3*b* displays a portion that corresponds to the selected heading.

FIG. 5 shows an exemplary table content of a reference manual that is stored in the device manual storage unit 4*b* according to the current invention. The manual is assumed to have chapters and paragraphs, and the storage locations or addresses of these subdivided portions of the manual are placed in a list. The exemplary table contains a manufacturer code column, a device code column, a whole manual column, a first partial manual column, a second partial manual column, . . . a Nth partial manual column. The manufacturer code column and the device code column respectively contain manufacturer code 25 and device code 24. The whole manual column, the first partial manual column, the second partial manual column, . . . the Nth partial manual column respectively contain an address at which each of the specified portions of the manual is stored in the device manual storage unit 4*b*. The specified portion is determined by a combination of the above described search conditions, and the corresponding chapters and paragraphs are referenced for desired viewing of the partial manual.

In the preferred embodiment, the above device manuals are written in eXensible Markup Language (XML) rather than Hyper Text Markup Language (HTML). The device manual format conversion unit 4*c* provides a means for processing a portion or a whole of the device manual from the device manual storage unit 4*b*. That is, for example, the device manual is converted into a predetermined format that is convenient for a user based upon the information from the manual display unit 3 such as the display specification information. One example of the processing is to edit and generate the screen display data. To display on the screen, the information is displayed in HTML. In consideration for the screen display size, the length of one screen is desirably limited by dividing data into groups. Since the device manual itself is written in XML, the manual data is converted into HTML via proper conversion script. Another example of processing includes the generation of the printing data. To print out, the data is desirably organized into a single data structure as in HTML or a page structure as in portable document format (PDF). Thus, a conversion process is performed by a proper script or a layout engine if necessary. The device manual format conversion unit 4*c* further includes a device manual format switch unit $4c_1$. Based upon the control by the device manual format switch unit $4c_1$ in the device manual format conversion unit 4*c*, the screen display format and the print format are respectively switched in response to a user specification.

Now referring to FIG. 6, an exemplary display is shown in a preferred embodiment of the display unit according to the current invention. One more example of the processing is a conversion method of adding to the related product information or maintenance information that is defined in the device manual definition unit 4*a*. The searched manual information and the above additional information are edited to generate the HTML data to be outputted for display on the same screen by using the frame function of HTML. In other words, the device manual format conversion unit 4*c* converts the searched manual information and the related/additional information into a predetermined format which enable to display on the same screen. For example, the related or additional information includes information on the products and services or the new products that are related to the searched product. The exemplary related or additional information also includes information on the maintenance such as warranty on parts and recall notices. The above described information is displayed in an exemplary screen display which includes a device manual content display frame and a related information display frame. By using the HTML frame function, the manual content is displayed in the left frame while the related or additional information is displayed in the right frame.

The device manual definition unit 4*a* identifies the product code 24 and the manufacture code 25 in the search key information from the manual display unit 3 via wide area network. If the search key information contains correct information, the search key information is passed to the device manual storage unit 4*b*. Furthermore, if any search condition is received, the search condition is simultaneously sent to device manual storage unit 4*b*. Subsequently, the device manual definition unit 4*a* transfers to the manual display unit 3 the device manual or the partial device manual that has been returned from the device manual storage unit 4*b*. The device manual definition unit 4*a* is implemented as a World Wide Web (WWW) server. The manual display unit 3 extracts a desired device manual by specifying a corresponding Universal Resource Locator (URL) that is given to the manual server 4.

Now referring to FIG. 7, a flow chart illustrates steps involved in a preferred process of searching the manual according to the current invention. In a step S1, a user activates the manual display unit 3 for displaying a device manual. The manual display unit 3 initiates the device information obtaining unit 3*a* to send a device inquiry or a device information request according to a predetermined protocol. Among the devices that are connected to the local area network 5, the device information obtaining unit 3*a* requests for the information for the devices whose manuals can be displayed. In a step S2, the selection information such as the product type information 23, the product name 21 and the manufacturer name 22 is generated and displayed in a list on the screen from the device information that has been returned from each of the devices. In a step S3, a user selects a particular one of the product names 23, which has been listed to specify a device whose reference manual is to be displayed. In the step S3, the user further specifies a search condition for limiting the display detail search information as well as a display condition for limiting an output location such as screen and printout. In a step S4, via a wide area network that is connected to the local area network, the manual display unit 3 sends search key information, search conditions and a display method to the manual server 4 for specifying a device whose reference manual is to be displayed. The manual server 4 searches for a matching manual based upon the search key information and further searches for a matching portion within the matching manual if there is a search condition. When the search result contains more than one manual or one portion in a step S5, the preferred process proceeds to a YES path to a step S6. In the step S6, the manual server 4 returns to the manual display unit 3 a list of headings such as chapter or paragraph headings in a single reference manual. The manual display unit 3 displays the list, and the user selects from the list in the step S6. The selected heading information is sent to the manual server 4. In response, the manual server 4 returns to the manual display unit 3 via wide area network a portion of the manual such as a corresponding chapter or paragraph based upon the selected heading information. On the other hand, when there is no search condition for a manual stored in the device manual storage unit 4*b* or the search result is singular regardless of the search condition, the preferred process proceeds to the NO option in the step S5. In the above NO path, the searched device manual or a portion thereof is returned to the manual display unit 3 via the wide area network 6. In a step S7, the manual display unit 3 outputs to a specified output location the returned portion of the manual that has been sent to the device manual display unit 3*b*. The specified output location includes a screen and a printout. From the manual server 4, the device manual format conversion unit 4*c* has edited the output data for either the screen display or the print out.

Still referring to FIG. 7, certain steps are modified in an alternative process of searching the manual according to the current invention. In the step S1, a user activates the manual display unit 3 for displaying a device manual. The manual display unit 3 sends a device inquiry or a device information request to the manual server 4 according to a predetermined protocol. When each of the devices is connected to the local area network 5, the device registers its selection information with the manual server 4 for later displaying its manual upon request. The selection information includes the product type information 23, the product name 21 and the manufacturer name 22, and a list is generated in the step S2 in response to the device inquiry or the device information request. The generated list is returned to the display unit 3 from the manual server 4.

Now referring in particular to FIG. 8, a block diagram illustrates an overall view of a second preferred embodiment of the reference manual search system according to the current invention. In general, the second preferred embodiment is substantially the same as the first preferred embodiment as described with respect to FIG. 1. The second preferred embodiment includes a first device 1, a second device 2, a manual display unit 3 that has been incorporated in each of the first and second devices and a manual server 4. The first device 1 and the second device 2 are connected to a common local network 5 and perform a predetermined function. The first device 1 and the second device 2 are not only information processing devices such as personal computers, printers and scanners but also any office equipment such as copiers and fax machines. Furthermore, the first device 1 and the second device 2 also include home appliances such as audio visual equipment and washers. The first device 1 and the second device 2 are a target for the reference manual search according to the current invention. The incorporated manual display unit 3 displays any specified reference manual that is stored in the manual server 4. By directly operating the manual display unit 3, the user sees a desired reference manual for a specified device.

In the second preferred embodiment of the reference manual search system according to the current invention, the manual server or reference manual storage server 4 centrally stores reference manuals for various devices and or appliances. The manual server 4 communicates with the manual display unit 3 through a wide area network 6 such as the Internet and the intranet, which is connected to the local area network 5. That is, when the manual display unit 3 transmits a manual transmission request to the manual server 4 via the networks 5 and 6, the manual server 4 responds by transmitting a corresponding reference manual to the manual display unit 3 of the corresponding device. The second preferred embodiment does not necessarily include the opposite request from the manual server 4 to the manual display unit 3. The manual display unit 3 further includes a device information obtaining unit 3*a*, a device manual display unit 3*b*, a device list-selection unit 3*c* and a search condition specification unit 3*d*. The manual server 4 further includes a device manual definition unit 4*a*, a device manual storage unit 4*b* and a device manual format conversion unit 4*c*. The device manual storage unit 4*b* further includes a device manual search unit 4*b*1 whereas the device manual format conversion unit 4*c* includes a device manual format switch unit 4*c*1.

Still referring to FIG. 8, in the second preferred embodiment, the first device 1 and the second device 2 respectively further include a device information response unit 1*a* and 2*a*. When the first device 1 or the second device 2 receives an inquiry request for the device information from the manual display unit 3, the device information response units 1*a* and 2*a* respond to the request. The device information inquiry request includes predetermined key information for a key search to obtain a corresponding manual from the manual server 4 and device selection information for a user selection list to be displayed on the device list selection unit 3*c*, which is equipped in the manual display unit 3. For example, the above search key information to be used as a key for the manual server 4 includes a device code that uniquely specifies a device product name or a device product type and a manufacturer code that uniquely specifies a device manufacturer. The search key information is not limited to the above example and includes any other information that is used to specify a desired reference manual for a specified device. Similarly, one example of the device selection information for a user selection list to be displayed on the device list selection unit 3*c* includes a product name that indicates an unique product name and corresponds to a predetermined one of the product code, a manufacturer name that specifies a manufacturer and corresponds to a predetermined one of the manufacturer code as well as a product type that classifies products into groups such as copiers and washers. The device selection information is not limited to the above example and includes any other information that is used by a user to select a desired device.

The device information obtaining unit 3*a* in the manual display unit 3 broadcasts or multicasts a device information inquiry request in the local area network 5. A device receives the broadcast and determines whether or not the device inquiry request is addressed to the received device itself. Upon acknowledging the device inquiry request, the devices 1 and 2 transmit its own device selection information to the device information obtaining unit 3*a* in the manual display unit 3 based upon a predetermined protocol. The information obtaining unit 3*a* is activated when the manual display unit 3 is initiated. To obtain the device information for a user-specified device for later displaying the corresponding device manual, the information obtaining unit 3*a* transmits the above described device information inquiry request onto the local area network 5. As described above, the information obtaining unit 3*a* broadcasts or multicasts the device information inquiry request. When a device identifies that the device information inquiry request is addressed to the device, the corresponding device information response unit such as 1*a* and 2*a* responds by transmitting its own device information to the information obtaining unit 3*a* of the manual display unit 3 in accordance with a predetermined protocol. Thus, the device list selection unit 3*c* collects the device information from the responding devices. As an alternative embodiment, the device information response units 1*a* and 2*a* are incorporated in the display unit 3. However, the content of the information that the device information response units 1*a* and 2*a* transmits to the manual server is respectively unique to the devices 1 and 2 while the components in the display unit 3 are identical in the devices 1 and 2.

As described above, the device manual search system according to the current requires only simple operations and displays a whole or partial manual for the desired device in a specified format. The above description includes various implementations for the manual search system according to the current invention. The implementations include a method for performing the above steps or computer programs that perform the above described steps.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of providing online information, comprising the steps of:

connecting devices to a network;

storing predetermined sets of information on the devices in a single server that is connected to the network;

requesting from a display unit the devices for which the information is available to compile a first list;

displaying a first list of the devices at the display unit;

selecting one device from the list at the display unit;

transmitting device information on at least the selected device from the display unit to the server;

searching at the server for the information that corresponds to the device information to generate relevant information; and transmitting from the server to an output location the relevant information.

2. The method of providing online information according to claim 1 wherein each of the sets of the information is organized in a reference manual.

3. The method of providing online information according to claim 2 wherein the reference manual further includes predetermined units of information.

4. The method of providing online information according to claim 3 further comprising additional steps of:

specifying a search key for a particular one of the units in the relevant information;

generating partial relevant information based upon the search key; and transmitting to the output location the partial relevant information.

5. The method of providing online information according to claim 1 wherein the list is generated based upon the device information from each of the devices connected to the network after inquiry is broadcasted to the devices.

6. The method of providing online information according to claim 1 further comprising additional steps of:

displaying a second list of predetermined output locations; and selecting one of the output locations from the second list.

7. The method of providing online information according to claim 1 wherein the information includes reference information on the devices.

8. The method of providing online information according to claim 1 wherein the information includes related information on the devices.

9. The method of providing online information according to claim 8 wherein the related information includes related products.

10. The method of providing online information according to claim 8 wherein the related information includes maintenance information.

11. The method of providing online information according to claim 1 further comprising an additional step of converting a format of the relevant information based upon the output location prior to said transmitting to the output location.

12. The method of providing online information according to claim 11 wherein the output location includes a printer and a display window.

13. The method of providing online information according to claim 12 wherein reference information and related information on the devices are simultaneously shown in the display window.

14. The method of providing online information according to claim 1 further comprising additional steps of:

registering the devices with the server for compiling the first list of the devices for which the information is available as the devices are connected to the network;

displaying the first list of the devices; and selecting one device from the first list.

15. A system for providing online information, comprising:

devices that are connected to a network;

a manual server connected to the network having a memory storage unit for storing predetermined sets of information on said devices; and a manual display unit connected to the network further including a display panel as the output location for displaying relevant information, said manual display unit requesting said devices for which the information is available to compile a first list, said display panel displaying the first list of said devices, said display panel having an input capability for selecting one of said devices from the first list, said manual display unit transmitting device information on at least said selected one device to said manual server, wherein said manual server searches the memory storage for the information that corresponds to said selected device information to generate the relevant information, said manual server transmitting to an output location the relevant information.

16. The system for providing online information according to claim 15 wherein each of the sets of the information is organized in a reference manual.

17. The system for providing online information according to claim 16 wherein the reference manual further includes predetermined units of information.

18. The system for providing online information according to claim 17 wherein said manual display unit further comprises a search key specification unit for specifying a search key for a particular one of the units in the relevant information, said manual server further comprising a device manual search unit for searching and generating partial relevant information based upon the search key, said manual server transmitting to the output location the partial relevant information.

19. The system for providing online information according to claim 15 wherein said devices each further comprise a device information response unit, said manual server broadcasting an inquiry to said devices, said manual server compiling the list based upon the device information that is sent from each of said device information response unit that is connected to the network in response to the inquiry.

20. The system for providing online information according to claim 15 wherein said devices each further comprise a device information response unit for registering the device information with said manual server, said manual server compiling the list based upon the device information.

21. The system for providing online information according to claim 15 wherein said display unit further displays a second list of predetermined output locations on said display panel for selecting one of the output locations from the second list.

22. The system for providing online information according to claim 15 wherein the information includes reference information on said devices.

23. The system for providing online information according to claim 15 wherein the information includes related information on said devices.

24. The system for providing online information according to claim 23 wherein the related information includes related products.

25. The system for providing online information according to claim 23 wherein the related information includes maintenance information.

26. The system for providing online information according to claim 15 wherein said manual server further comprises a format converter unit for converting a format of the relevant information based upon the output location prior to transmitting to the output location.

27. The system for providing online information according to claim 25 wherein the output location includes a printer and a display window.

28. The system for providing online information according to claim 27 wherein said display panel displays reference information and related information on said devices in the display window.

29. A device for interfacing online information from a manual server connected to a network having a memory storage unit for storing predetermined sets of information on devices, a manual display unit broadcasting an inquiry to the devices, the manual server searching the memory storage for the information based upon specified device information to generate relevant information, said manual server transmitting to an output location the relevant information, each of said devices connected to the network for performing a predetermined task, each of said devices comprising:

a device information response unit for transmitting device information to said manual display unit in response to the inquiry, said manual display unit compiling a device list based upon the device information and transmitting the device list to said devices;

an input unit for selecting one of devices from the device list by transmitting the specified device information on the selected one of said devices to the manual server via the network; and a display panel as the output location for displaying the relevant information.

30. The device for interfacing online information according to claim 29 wherein each of the sets of the information is organized in a reference manual.

31. The device for interfacing online information according to claim 30 wherein the reference manual further includes predetermined units of information.

32. The device for interfacing online information according to claim 31 further comprising a search key specification unit for specifying a search key for a particular one of the units in the relevant information, said manual server further searching and generating partial relevant information based upon the search key, said manual server transmitting to the output location the partial relevant information.

* * * * *